United States Patent [19]

Morgan

[11] 4,230,520
[45] Oct. 28, 1980

[54] AUTOMATIC TAPE WINDING MACHINE

[75] Inventor: Scott J. C. Morgan, Bridgnorth, England

[73] Assignee: Decca Limited, London, England

[21] Appl. No.: 933,556

[22] Filed: Aug. 14, 1978

[51] Int. Cl.³ .................. B31F 5/06; G03D 15/04
[52] U.S. Cl. .................................. 156/505; 156/506
[58] Field of Search .................. 156/502, 506, 505; 242/56 R

[56] References Cited

U.S. PATENT DOCUMENTS

| 3,693,900 | 9/1972 | Bohn | 156/506 |
| 3,753,835 | 8/1973 | King | 156/506 |
| 3,797,770 | 3/1974 | Hosoda et al. | 156/506 |
| 3,825,461 | 7/1974 | Gorman | 156/506 |
| 3,888,480 | 6/1975 | Bagozzi | 156/506 |
| 4,062,719 | 12/1977 | Masuzima et al. | 156/506 |

Primary Examiner—Caleb Weston
Attorney, Agent, or Firm—Kenyon & Kenyon

[57] ABSTRACT

An automatic tape winder in which a splicer includes a tape applicator which includes a holder which moves back and forth along a length of splicing tape, holding it by vacuum suction to draw it from a stock and passing it via a cutter to a punch which holds it by vacuum suction. Also described is an extractor which blows leader tape from a cassette to a clasp which draws the leader over a splicing block.

5 Claims, 5 Drawing Figures

AUTOMATIC TAPE WINDING MACHINE

BACKGROUND OF THE INVENTION

This invention relates to winding machines, particularly automatic machines which load magnetic tapes into standard cassettes, and also to applicators which may be used in splicing magnetic tapes in such winding machines.

According to the present state of the art, a standard cassette has a leader tape, the ends of which are anchored, one to each of the hubs of the cassette. The cassette usually has a narrow face which is apertured so as to expose a length of the tape. Extending through each cassette near the region of exposure of the tape are two ports, of which one or other normally receives the spindle of a capstan when the cassette is used in a recording or playback machine.

SUMMARY OF THE INVENTION

Whether a fully automatic or partially automatic machine is used for loading the cassette, the procedure for loading usually comprises the following steps. A loop of the exposed leader tape is drawn from the cassette. The loop thus formed is drawn over a splicing block and one shank of the loop is retained on a channel in the block. The other shank of the loop is held away from the block while the loop is severed and one of the severed ends of the loop is spliced to the magnetic tape.

One object of the present invention is to improve the operation of the splicer. An important feature of the invention is an applicator which may constitute part of the splicer but may have a more general utility. An applicator according to the invention preferably comprises a reciprocatable holder which can move lengthwise of a splicing tape and can hold the tape by vacuum suction while it moves to draw the tape from a stock and can release the tape during a reverse movement, a punch which can hold by vacuum suction tape passed to it by the holder and which is movable to apply the tape that it holds, and a cutter for severing tape held between the holder and the punch.

After one of the severed ends of the leader loop has been spliced to the adjacent end of the magnetic tape, the magnetic tape is usually wound into the cassette, the winding being stopped when a sufficient, normally a predetermined, quantity of tape has been wound into the cassette. The tape is again severed, the tape is spliced to the other end of the leader, which meanwhile has been held on the splicing block, and the remaining loop is wound back into the cassette. The cassette is then ejected from a magazine and a fresh cassette in the magazine is disposed in position ready for loading. There are in common use many partially automatic machines in which most of the foregoing steps are or can be automatically controlled; one notable exception is the initial step of withdrawing the leader loop from the cassette. There are proposals for the automatic performance of this action, which is often done manually. Nevertheless, there are difficulties in achieving satisfactory operation and it is a further object of the present invention to provide a winding machine which includes an improved arrangement for the extraction of a leader loop and for drawing the loop over a splicing block. Accordingly, the invention also provides a machine in which the loop of tape is blown, preferably by a pneumatic blast from a hollow probe that enters a hole intended to accommodate a capstan, into the ambit of a sliding clasp which closes to ensnare the loop and then draws it over a splicing block.

BRIEF DESCRIPTION OF THE ACCOMPANYING DRAWINGS

FIG. 1 is a schematic view of an automatic winder;
FIG. 2 is an end view of the winder;
FIG. 3 is a schematic view of the loading region of the winder;
FIG. 4 is a detail of part of the winder; and
FIG. 5 is a sectional view of part of the winder.

DESCRIPTION OF THE PREFERRED EMBODIMENT

Figure 1:
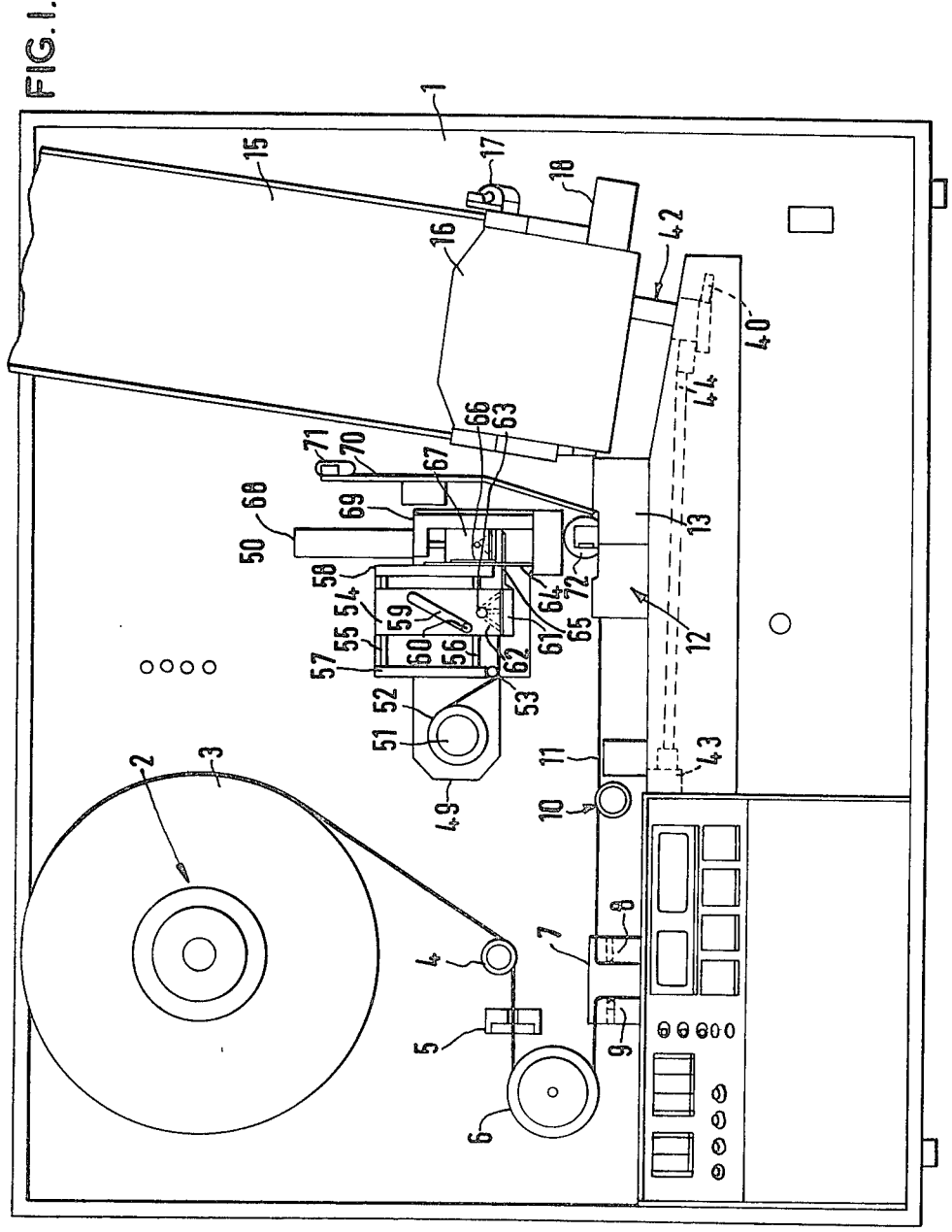

The principal mechanical components of the automatic winder are mounted on a vertical plate 1. Mounted on the plate is a spool 2 which has a motor and a brake (not shown). The spool carries a reel 3 of magnetic tape, which may be blank or may carry a plurality of recordings of a programme in series along itself. Tape which is played off from the reel 3 passes round a guide 4 and through a photoelectric sensor 5 which is used to detect a break in the magnetic tape and thereby to instigate an alarm and stop the machine. The tape passes round a counter wheel, which drives an indicator which indicates the length of tape which has passed; this wheel 6 also serves to provide a velocity feedback signal to an electrical servomechanism that regulates the speed of the tape. The tape passes into a buffer chamber 7 constituted by a vacuum trough. Across the mouth of the trough is a sensor constituted by a photoemitter 8 and a photodetector 9 which sense when tape is pulled out of the trough. The detector controls the power to the motor for the spool 2 in order to ensure that tape is being wound into the cassette, as hereinafter described, before power is applied to the motor for the spool 2.

Downstream of the tape from the buffer chamber 7 is a guide 10 immediately preceding a wide gap magnetic head 11. This head serves to detect a cueing signal which is recorded on the tape for a purpose mentioned hereinafter.

Further along the path of the tape is a pair of splicing blocks 12 and 13. The block 13 is fixed but the block 12 can be shifted pneumatically in a direction across the path of the tape. Each block has in its upper surface two parallel channels which are provided with a row of ports to which vacuum suction can be applied. When the block 12 is fully retracted, its rear channel, that is to say the channel nearer the plate 1 is aligned with the rear channel of the block 13 and the front channels of the two blocks are likewise aligned. When the block 12 is laterally shifted, its rear channel is aligned with the front channel of the block 13. There is a small gap between the blocks to accommodate a cutter which may be advanced into the gap, to cut tape which is for the time being held by vacuum suction in the aligned channels of the blocks.

Above the splicing blocks 12 and 13 is the applicator which constitutes the remainder of the splicer. This will be described later.

At the right-hand side of the front plate is a substantially vertical, but slightly tilted chute 15 which constitutes a magazine for cassettes that require loading. The lowermost cassette in the magazine is in the position for loading and would be disposed such that the aperture through which the tape is exposed is lowermost. The other cassettes form a narrow stack above the lowermost cassette in the magazine and, when the lowermost cassette is ejected force of gravity acting on the stack causes the next cassette to take the loaded cassette's place. The lower part of the front of the magazine is constituted by a flap 16 which is hinged and can be opened by means of a pneumatic cylinder 17 to permit ejection of a loaded cassette. A microswitch 18 senses the arrival of a cassette in the position for loading.

As thus far described the machine is (except for the particular splicer) of commonplace construction. Its operation and the control of its operation by means of various switches and logic circuits, follows ordinary practice. Accordingly, the various sensing switches and control circuits have not been described.

The two principal differences from known practice lie in the construction and manner of operation of the tape applicator and in the construction and manner of operation of the extractor by means of which the lead tape in the lowermost cassette is withdrawn and laid over the splicing blocks.

Figure 2:
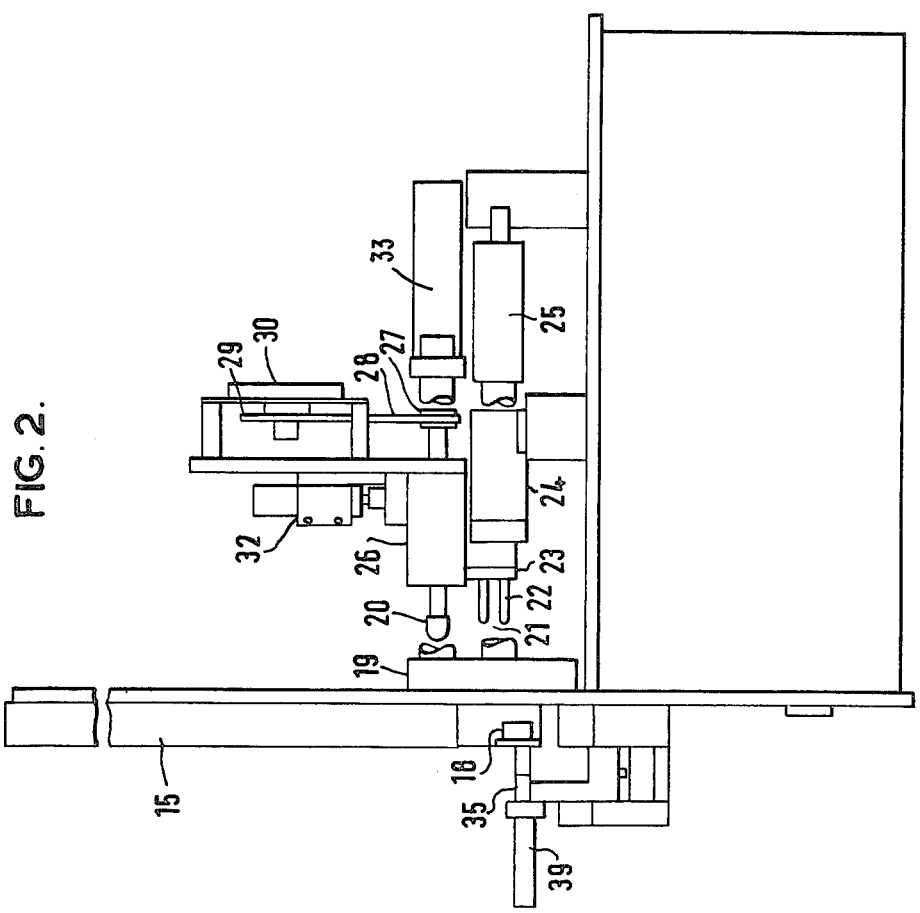

Behind the lowermost part of the magazine, which in this region is open at the rear, is a support 19 (FIG. 2) which provides passageways for a drive spindle 20 and two probes 21 and 22. It will be recalled that a cassette normally has one aperture, in a broad face, intended for the drive spindle of a capstan which traverses the tape when the cassette is in normal use. The pin 21, which is hollow and has a lateral aperture near its tip, enters the hole intended for the drive capstan. Normally the cassette has at least one other aperture used either for location of the cassette in a player 22: the pin 22 enters this hole. The spindle 20 engages one or other of the tape reel spindles in the cassette in order that, when the leader tape is attached to the end of the tape which is fed off the spool 2, the tape may be wound into the cassette.

Obviously, the construction must be modified if the cassette is what is currently known as a "micro cassette" but provided that the cassette has an aperture of the spindle of a drive capstan and at least one externally drivable tape reel, a similar construction to the one that has been described may be employed.

The pins 21 and 22 extend from a pad 23 made of expanded polymeric foam; this and the two pins are mounted on a slider 24 which may be advanced by means of a pneumatic cylinder 25 to insert the pins in their proper locations in the cassette which requires loading.

The drive spindle 20, passes through a housing 26 and carries a pulley 27 which is driven by means of a belt 28 and another pulley 29 by a drive motor 30. The motor 30 is supported on a frame 31 which also carries a pneumatic cylinder 32 which can move a forked foot (not shown) into engagement with the drive spindle 20 to brake it. The drive spindle 20 may be moved back and forth, to provide engagement and disengagement of the drive spindle 20 and the drive spindle of the cassette, by means of a pneumatic cylinder 33.

Figure 3:
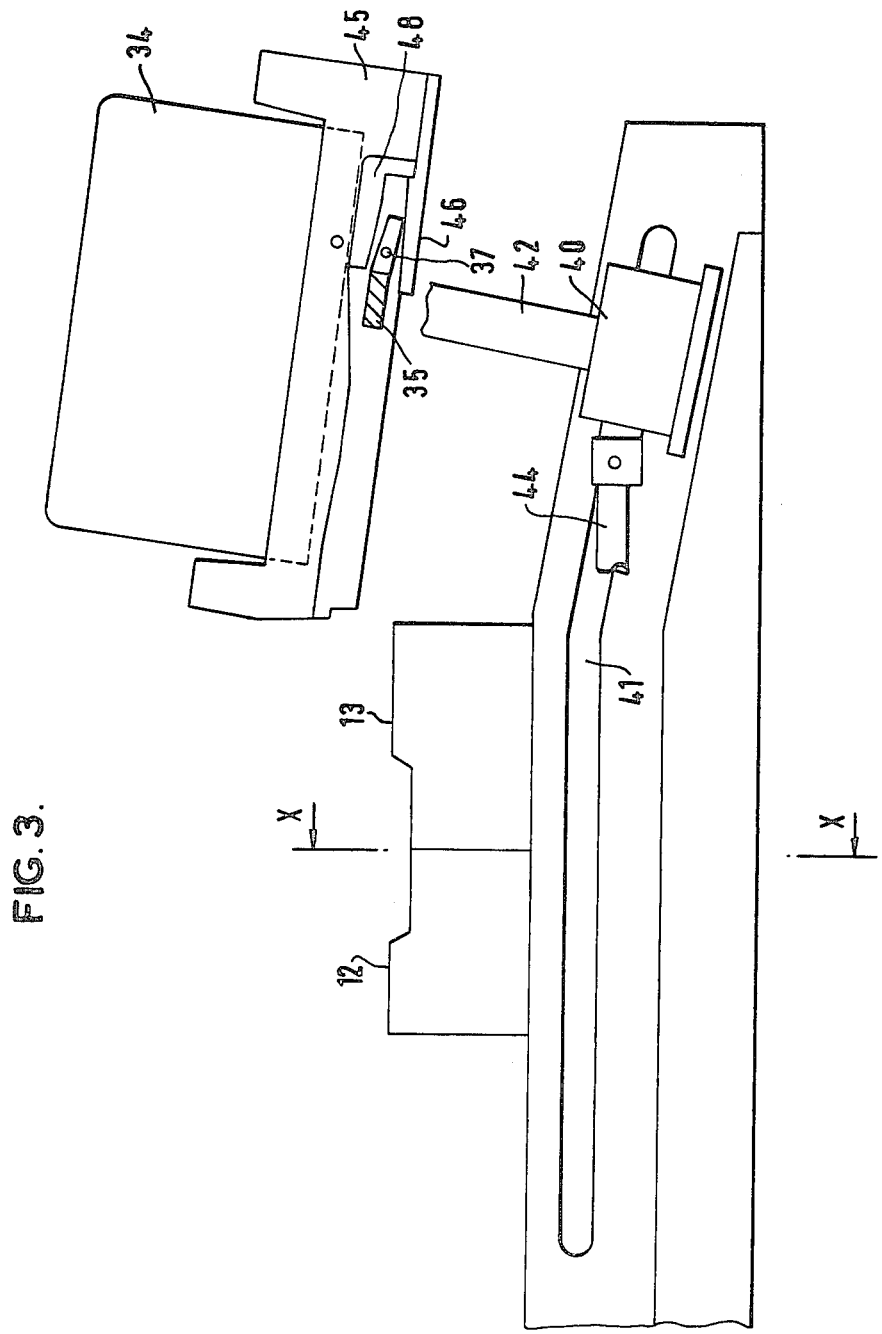
Figure 5:
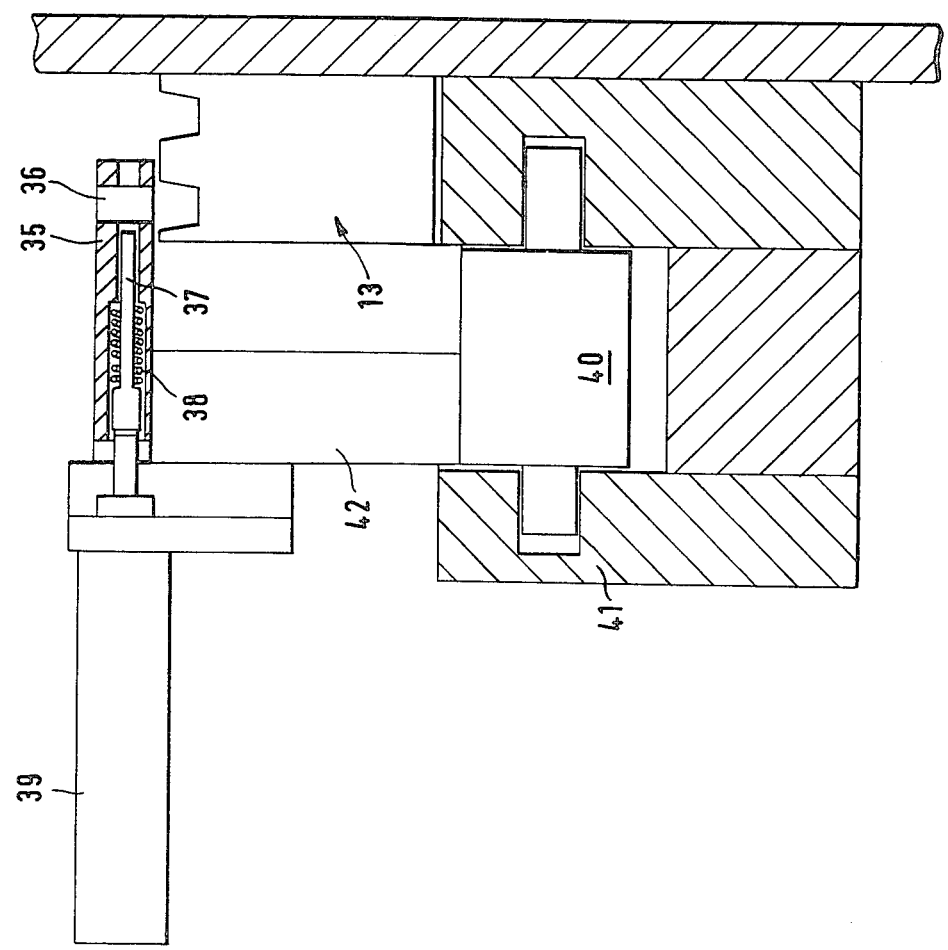

Immediately below the cassette 34 (FIG. 3) which is in the position for loading is a sliding clasp 35 which comprises an open slot 36 aligned lengthwise of the cassette (FIG. 5). A pneumatically operated pin 37 can be advanced across the slot against the restoring force of a spring 38. The clasp 35 carries a small pneumatic cylinder 39, for activating the pin. The clasp has a foot 40 which slides in a guideway 41 which is inclined at approximately the same angle to the horizontal as the cassette; the guideway slopes up to the region of the splicing blocks 12 and 13 and then extends horizontally past and below them. A pillar 42 extends upwardly from the foot to the clasp 35: the cylinder 39 is mounted laterally of this pillar. The clasp may be reciprocated back and forth along the guideway by means of a pneumatic cylinder 43 which has a connecting rod 44 attached to the foot 40.

Figure 4:
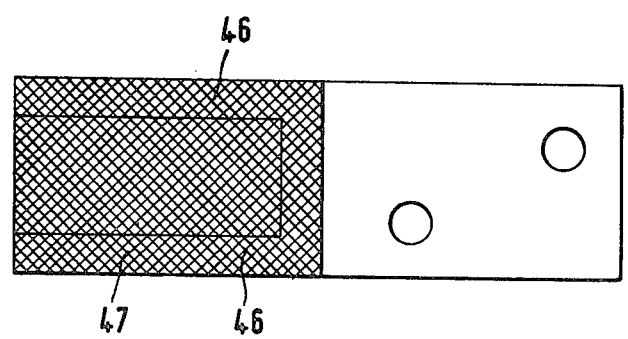

The cassette 34 is supported by a holder 45 (FIG. 3) which carries, below the position of the clasp a pair of prongs 46 (FIG. 4) over which is disposed a sheet of wire gauze 47. Above the clasp is a tapered guide 48. The purpose of these features will be described later.

The applicator comprises a plate 49 which is vertically reciprocable, being mounted on a carriage behind the plate 1 by means of bolts which pass through a vertical slot in this plate. The carriage moves on parallel vertical bars and under the action of a double acting piston and cylinder referenced by 50 in FIG. 1.

The plate 49 carries a reel 51 of splicing tape 52. The tape passes under a guide post 53 to the under surface of a slider 54. This slider is mounted for horizontal sliding movement relative to the plate 49 and for this purpose is mounted on horizontal parallel bars 55 and 56 which are mounted between parallel vertical beams 57 and 58 affixed to the plate 49. The slider 54 has an oblique slot 59 which is engaged by a pin 60 that is fixed to the front plate 1. Accordingly, the slider moves to the left as the slider moves downwardly and moves to the right as the slider moves upwardly. Under the slider is a pad 61, which supports the tape 52 during the upward movement of the slider. The under surface of the slider has a row of ports to which pneumatic suction can be applied via a manifold 62 within the block; the manifold extends to a port 63 which is connected to a flexible pneumatic line, a solenoid valve and a vacuum pump (not shown).

To the right of the extreme right-hand position of the slider, and secured to the right-hand side of the beam 58, is a vertical blade 64 which has an aperture 65 at a position approximately in line with the bottom face of the slider. Adjacent the blade 64 is another, relatively movable blade 66 which is attached to the side of a punch 67 that is reciprocable vertically relative to the plate 49 by means of a piston 68 mounted on a bracket 69 secured to the plate 49. The under surface of the punch has a row of ports to which vacuum suction is applied by means of a flexible line feeding a manifold in the punch.

It will be observed that when the punch is moved downwardly relative to the plate when the plate is at the lowest point of its movement, the blade 66 which is alongside the punch 67 severs the tape at the aperture in the fixed blade. After the punch is moved to its upper position relative to the plate, the plate 49 moves upwardly, and meanwhile the slider moves across the plate, to draw tape from the reel and advance the end of the tape through the aperture in the fixed blade across the lower face of the punch. When an additional splicing operation is required, the vacuum suction to the ports in the lower face of the slider is terminated, the pad supporting the tape, and downward movement of the plate causes leftwards movement of the slider so that the slider moves effectively upstream of the tape ready to draw a further length of tape off the reel and to feed tape to the punch.

There follows a description of the cycle of operation of the whole machine.

The cycle may be presumed to commence when a cassette is in the position for loading. The clasp for the cassette advances and air is applied to the probe 21. The probes 21 and 22 pass into the apertures in the body of the cassette. A loop of the leader tape is blown out of the cassette into the fork of the leader guide and is supported by the gauze. The pin 37 is advanced to ensnare the loop of the leader tape. The leader loop is pulled out towards the splicing blocks and is dragged over the blocks. When the clasp reaches a left-hand limit position, the pneumatic supply to the cylinder 39 is cut-off, to allow the leader tape to fall into the aligned front channels of the splicing blocks. The end of the magnetic tape will have been disposed in the rear channel of the movable block. Suction is applied to the splicing blocks to hold the leader tape. Above the splicing blocks and mounted on the front plate is an arm 70 which is movable by a piston and cylinder 71 to swing outwardly and hold the upper shank of the leader loop away from the splicing blocks. After a short delay, a cutter 72 is caused to move between the splicing blocks to the magnetic tape, which is situated (initially) in the rear channels of the splicing blocks and held down by suction, and the leader tape which is lying in the front channels. The cutter is deactivated after a delay and the movable block 12 is moved forward to align the rear channel of the movable block with the front channel of the fixed block. The tape applicator is advanced to apply by means of the punch a short length of the adhesive tape to join the two lengths of tape which are in the front channels. When the splicer is at the top of its stroke, suction is applied to the face of the punch to hold the loose end of the splicing tape. No suction is applied to the lower face of the slider. As the applicator advances, the slider slides back over the tape 52. At the bottom of the travel of the plate 49, as detected by an appropriately positioned microswitch, suction is applied to the slider 54 which then holds the splicing tape. Simultaneously, air is supplied to the cylinder 68 which drives the punch and the adjacent blade down to sever the portion of the splicing tape; the punch travels downwardly to place the portion of the splicing tape down on to the front channels of the splicing blocks; the length of tape will extend for a short distance on each side of the gap between the blocks. After a short delay the punch returns to its upper position on the plate 49 and after a further short delay the plate 49 is raised to its upper position. As the plate returns, suction is removed from the lower face of the punch but is maintained on the lower face of the slider 54. Accordingly, during the upward stroke a new portion of tape is fed through the fixed blade 64 to the punch. At the top of the stroke of the plate 49 the suction is removed from the slider 54 but is maintained for the punch ready for the next splicing operation.

If splicing tape has not been properly fed forward, a pressure difference sensor signals that the suction ports on the punch are not fully covered. If the fault can be remedied, the machine sequence may be restarted.

When the magnetic tape is spliced to the leader tape and the drive spindle 20 has engaged the drive spindle in the cassette, power is applied to the take-up motor, suction is removed from the splicing blocks and the tape is wound into the cassette. The vacuum stores a short loop of magnetic tape; the front take-up motor must wind in this loop of tape so that the photoelectric detector may cause power to be supplied to the reel motor.

The control of the length of tape to be fed into the cassette proceeds according to ordinary practice; it is controlled by a footage counter if blank tape is wound in and a cueing signal if a predetermined length of tape with a pre-recorded programme on it is to be supplied.

When the tape has been brought to rest, suction is again applied to the splicer blocks. Before the winding operation the rear channel of the movable splicing block has been aligned with the front channel of the fixed splicing block, and the front channel of the movable block still holds the end of the upper shank of the leader. When the tape has settled in the splicing blocks, the cutter is activated in order to cut the magnetic tape. As the cutter is deactivated the movable splicing block is shifted back to its rest position, thus aligning the remaining end of the leader tape with the tail of the wound-in magnetic tape. As the movable splicing block shifts, the splicer descends and splices the end of the leader tape to the tail of the magnetic tape. As the splicer returns the suction is removed from the tape line and a pulse is supplied to the take-up motor in order that the spliced loop can be wound into the cassette. The leader guide returns towards its lower position; the leader separator returns to its rest position. When the leader guide reaches its right-hand limit position, the clamp for the cassette is released and the cassette is ejected.

I claim:

1. In an automatic tape-winding machine in which a loop of leader tape is extracted from a cassette to a splicing block for joinder to a magnetic tape which is wound into the cassette, the combination with said splicing block of an applicator of splicing tape, which applicator comprises:
    (a) means for providing a stock of splicing tape;
    (b) a reciprocable holder mounted for movement back and forth lengthwise of said splicing tape, said holder including means for holding said splicing tape by vacuum suction while said holder moves to draw splicing tape from said stock;
    (c) a punch for holding said splicing tape by vacuum suction and applying said splicing tape to said magnetic tape; and
    (d) a cutter disposed to sever splicing tape between the holder and the punch.

2. The combination set forth in claim 1, further comprising:
    (e) a mount which is reciprocable towards and away from the splicing block; and
    (f) means for coupling said holder for simultaneous reciprocating movement laterally of the movement of said mount.

3. The combination set forth in claim 2 in which the said means for coupling comprises means defining in said holder a slot oblique to the directions of movement of the mount and holder, and a pin carried on said mount for engagement with said slot.

4. The combination set forth in either claim 1 or claim 2 or claim 3, in which said cutter comprises a first, apertured, blade through which the splicing tape passes and a second blade movable with said punch alongside the first blade.

5. The combination set forth in claim 1, further comprising:
    means including a hollow probe insertable in the cassette for producing a pneumatic blast to force said loop out of the cassette;
    a clasp mounted for sliding movement between said cassette and said splicing block and positionable for reception of said loop; and
    means for positioning said clasp and effecting the movement thereof.

* * * * *

UNITED STATES PATENT AND TRADEMARK OFFICE
CERTIFICATE OF CORRECTION

PATENT NO. : 4,230,520
DATED : October 28, 1980
INVENTOR(S) : Scott John Charles Morgan It is certified that error appears in the above—identified patent and that said Letters Patent is hereby corrected as shown below:

Col. 3, line 31 - "player 22" should be --player--.

Signed and Sealed this

Tenth Day of February 1981

[SEAL]

Attest:

RENE D. TEGTMEYER

*Attesting Officer*     *Acting Commissioner of Patents and Trademarks*